E. MICHELIN.
AUTOMOBILE.
APPLICATION FILED OCT. 5, 1914.
1,191,809.
Patented July 18, 1916.
3 SHEETS—SHEET 3.
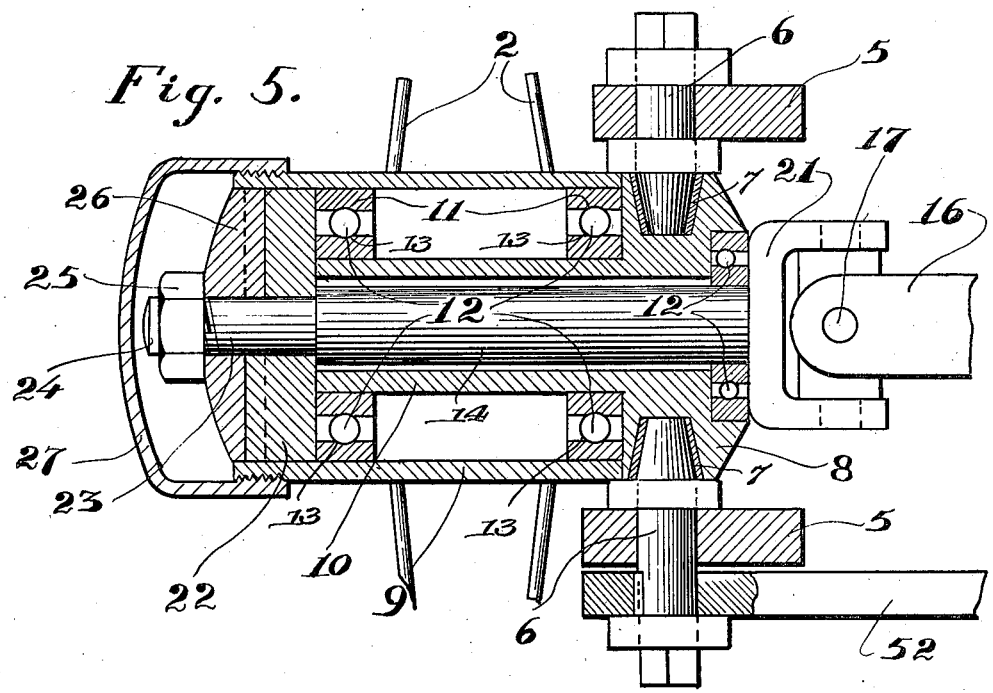
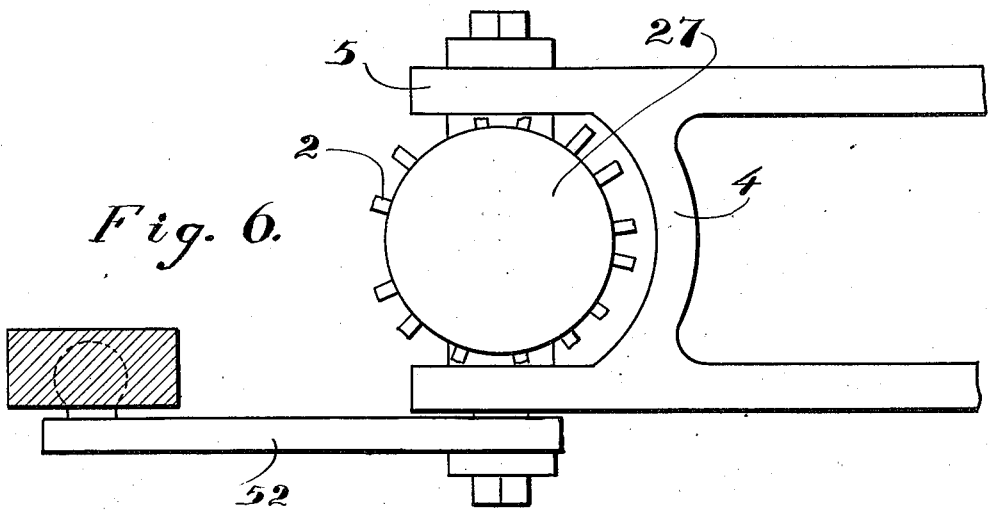
Witnesses
Inventor
E. Michelin.
Attorney

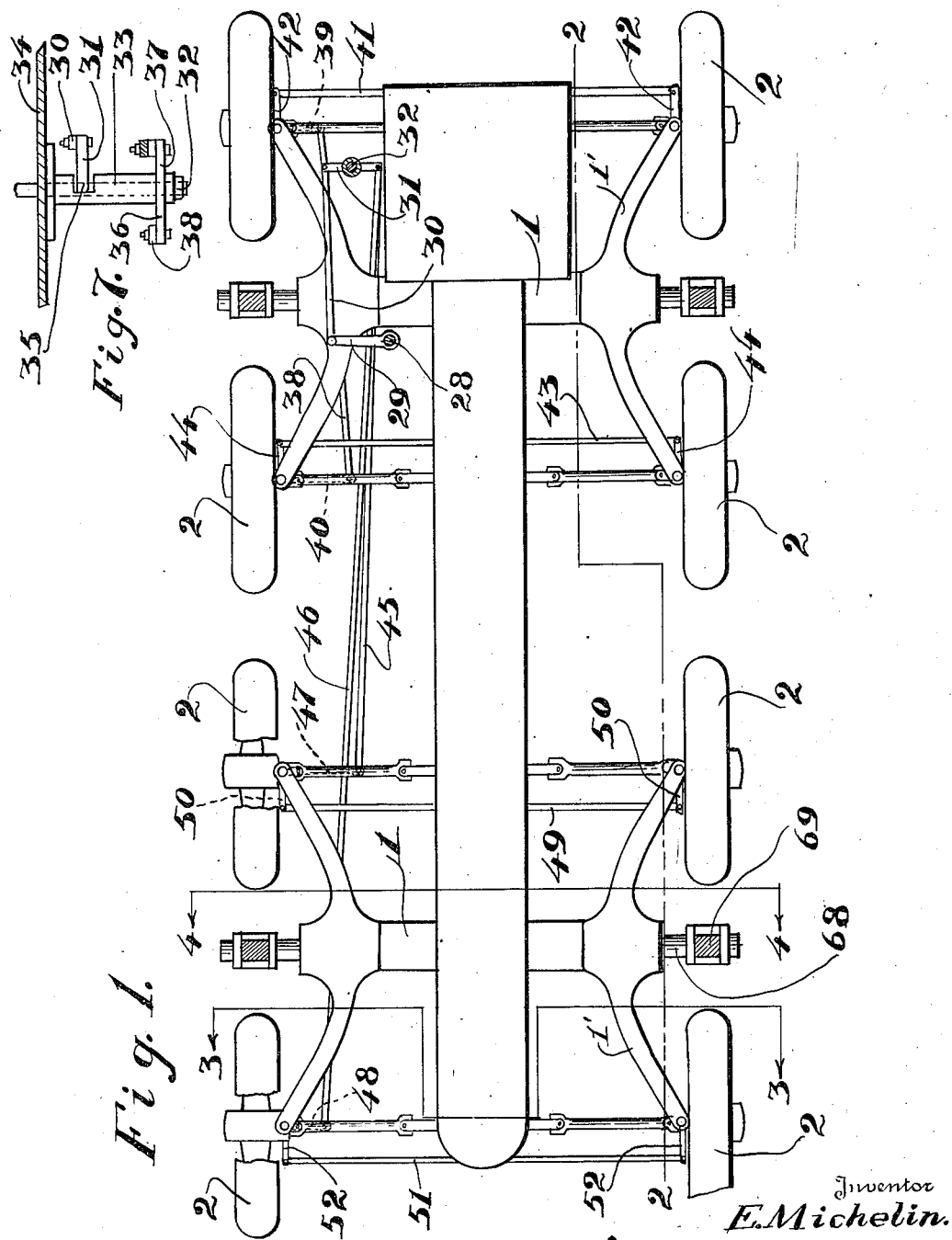

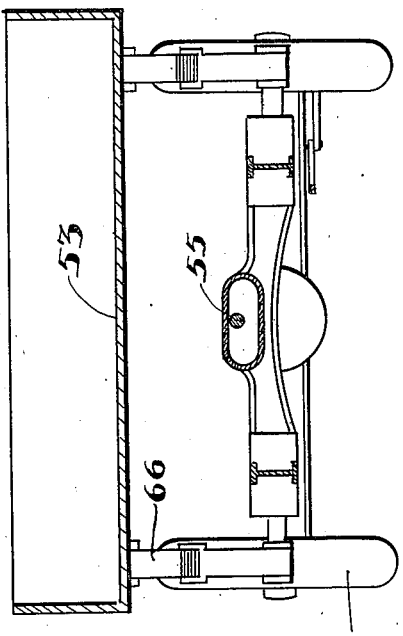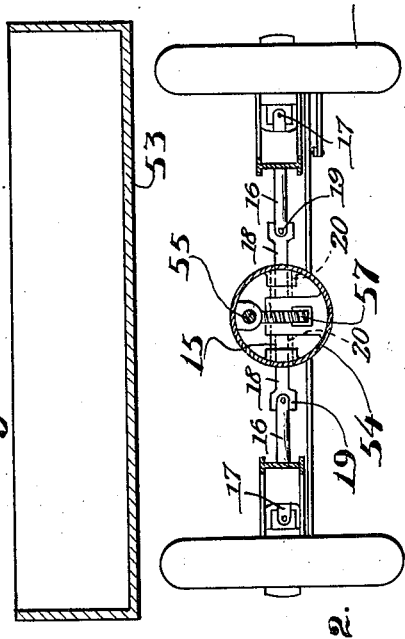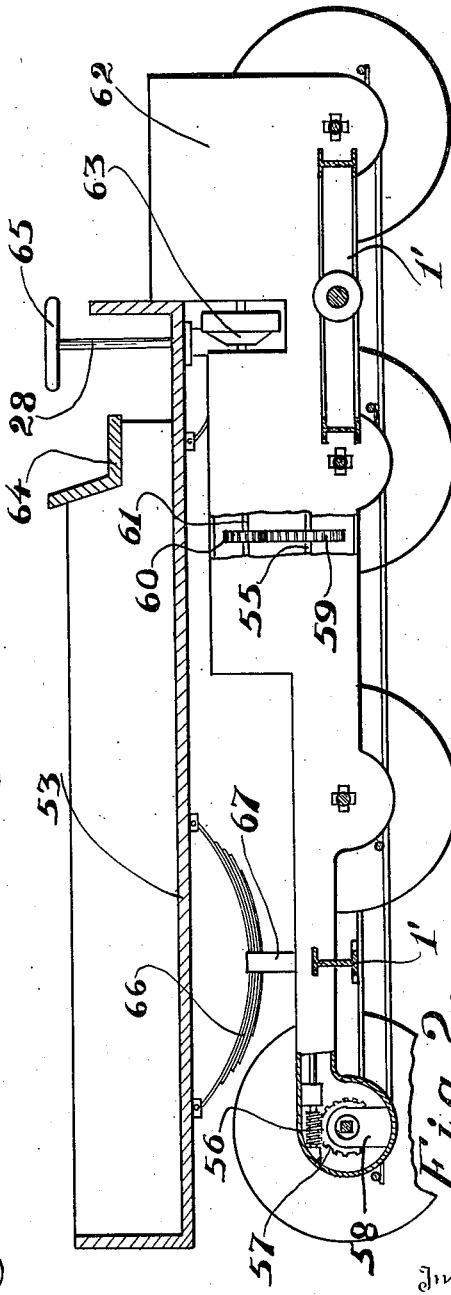

UNITED STATES PATENT OFFICE.

EUGENE MICHELIN, OF JACKSONVILLE, FLORIDA.

AUTOMOBILE.

1,191,809.　　　　Specification of Letters Patent.　　Patented July 18, 1916.

Application filed October 5, 1914. Serial No. 865,122.

*To all whom it may concern:*

Be it known that I, EUGENE MICHELIN, a citizen of the United States, residing at Jacksonville, in the county of Duval and State of Florida, have invented certain new and useful Improvements in Automobiles; and I do hereby declare the following to be a full, clear, and exact description of the invention, such as will enable others skilled in the art to which it appertains to make and use the same.

This invention comprehends certain new and useful improvements in automobiles and has for its primary object to provide an improved and novel form of automobile which will be constructed in such manner that the strain will be equally distributed upon the wheel of the vehicle and all of the wheels may be connected so as to turn when turning the vehicle to either side.

The invention has for another object to provide an automobile of this type which will include a pair of trucks upon which wheels are mounted in pairs and connected with the axles in such manner that they may readily turn to either side or move vertically for a short distance without interfering with the rotation of the wheels upon rotation of the axles.

The invention has for a further object to provide an automobile in which the trucks will be of such construction that four wheels may be carried by each truck and all of the wheels of both trucks connected to a steering member so that all of the wheels may be turned but at different angles when it is desired to turn the vehicle in either direction.

The invention has for a still further object to generally improve and simplify the construction and operation of automobiles and other motor driven vehicles and increase the efficiency thereof and equally distribute the strain upon the wheels of each truck and provide improved and novel turning and driving means for the wheels, without materially increasing the cost of the vehicle.

With the above and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a top plan view of my complete automobile with the exception of the body which is removed. Fig. 2 is a longitudinal section and extends on the plane of line 2—2 of Fig. 1, looking in the direction indicated by the arrow, the body also being shown in this view mounted above the truck and the vehicle being shown in a form of a motor truck or wagon, Fig. 3 is a transverse vertical section substantially on the plane of line 3—3 of Fig. 1 with the body of the vehicle in position, Fig. 4 is a view similar to Fig. 3 substantially on the plane of line 4—4 of Fig. 1 with the body in position, Fig. 5 is an enlarged vertical longitudinal section to one of the hubs and spindles, showing the construction and mounting of the same, Fig. 6 is an end elevation of the parts shown in Fig. 5, looking at the other end of the hub and spindle and showing the manner in which these parts are mounted in the frame of the truck, and Fig. 7 is a fragmentary elevation of a portion of the steering mechanism connected with the steering column.

Referring more particularly to the drawings in which similar reference characters designate corresponding parts throughout the several views, 1 designates the main transverse member of each of the trucks having the pairs or semi-circular arms 1' mounted centrally upon its opposite ends and in any suitable and well known manner so that the opposite outwardly curved ends of the arms 1' may move upwardly or downwardly upon engagement of the wheels 2 of the vehicle with an obstruction or depression in the path of the vehicle.

The outer ends of the arms 1' are bifurcated, as shown at 4 to provide the upper and lower supporting fingers 5 between which the spindles are positioned and supported by the upper and lower supporting pins 6, threaded through said fingers 5, as will be readily understood by referring to Figs. 5 and 6 of the drawing.

The inner tapered end of each pin 6 is engaged between the finger bushing rings 7 positioned in annular channels 8 formed in the inner end of the hub 9 of one of the wheels 2 engaged around the spindle 10 and having suitable channels 11 formed in its inner face adjacent its opposite end to accommodate bearing balls 12 positioned in corresponding and opposite channels 13 formed in the under face of the spindle 10. It will be understood that the spindle 10 is loosely mounted upon the outer section 14 of the axle 15, said outer section 14 being connected with the main or central driving section of the axle 15 by a section 16 and by a slidable section 18. The section 16 is connected to the outer section 14 by a universal joint 17, and the slidable section 18 is connected to the section 16 by a second universal joint 19. The slidable section 18 has a squared free end slidably engaged in the socket 20 formed in the end of said main or central section 15 of the axle.

It will be understood that the inner end of the axle section 14 is enlarged and bifurcated, as shown at 21 where the universal joint 17 is formed, while its outer extremity is passed through the clutch member 22 mounted upon the other end of the hub 9 and bearing against the outer end of the spindle 10, the axle section 14 being then squared, as shown at 23 with a threaded portion 24 outwardly of the squared portion 23 to receive a nut 25 to hold the second clutch member 26 upon the squared portion 23 of the axle section 14 and in engagement with the first mentioned clutch member 22 and thereby lock the hub 9 of the wheels 2 for rotation with the axle section 14. It will be understood that a suitable cap 27 is threaded upon the outer end of the hub 9 to inclose the clutch members 22 and 26 as well as the nut 25 of the hub 14 and thereby prevent foreign matter from reaching the interior of the hub 9.

From the foregoing it will be seen that the spindle 10 is stationary and the wheel 2 is rotated by the axle section 14 through the clutch members 22 and 26.

When it is desired to turn the wheels 2 for the purpose of turning the vehicle in either direction, the steering column 28 may be revolved by any suitable steering wheel or the like (not shown), to swing the arm 29 projecting from one side of the steering column 28 and at right angles to the same adjacent the lower end of said steering column 28. The arm 29 has pivoted to its free end the rod 30 which extends forwardly at an angle and has its free end pivoted to the end of the arm 31 projecting laterally from the turn bolt 32 which is mounted in a suitable support 33 depending from the vehicle body 34, it being understood that a suitable opening 35 provided in the side of the support 33 for the arm 31 to extend through. The turn bolt 32 has a pair of oppositely directed side arms 36 and 37, the arm 36 being pivoted to the rod 38 with its forward end inturned connected with an arm 39 projecting from the knuckle of the forward left wheel of the front truck while the rear end of the rod 38 is connected with a similar arm 40 projecting from the rear left wheel of the front truck, the arm 40 being considerably longer than the arm 39 whereby the left wheels of the front truck will be turned at the proper angles and the proper distances for turning the vehicle to the left or right, as desired. It will be understood that the front left wheel and front right wheel of the forward truck have their knuckles connected by the connecting steering rod 41 which has its opposite ends pivoted to arms 42 projecting forwardly and at an angle from the knuckles of said front wheels 2 of the forward truck. It will also be understood that the rear left wheel and rear right wheel of the forward truck are also connected by the connecting transverse steering rod 43 which has its opposite ends connected with the arms 44 projecting forwardly from and at an angle to the knuckles of said rear wheels of the forward truck.

Pivoted to the arm 37 of the turn bolt 32 are the rear steering rods 45 and 46, the rod 45 being the shorter rod and connected with an arm 47 projecting from the knuckle of the forward wheel 2 of the rear truck which arm is preferably slightly longer than the long arm 40 carried by the knuckle of the rear left wheel of the forward truck. The longer rear steering rod 46 is connected at its rear end to an arm 48 projecting from the knuckle of the rear left wheel of the rear truck, the arm 48 being considerably shorter than the arm 27 and about the same length of the arm 39 carried by the knuckle of the forward or front and left wheel of the forward truck. It will be understood that the forward right and left wheels of the rear truck are connected by each of the transverse connecting steering rod 49 which has its opposite ends connected with the arm 50 projecting at an angle to the knuckles of the said forward left and right wheels of the rear truck. It will also be understood that the rear left and right wheels 2 of the rear truck are connected by the transverse connecting steering rod 51 which has its opposite ends connected with the arms 52 projecting from and at an angle to the knuckles of said rear, left and right wheels of said rear truck thereby assuring the turning of the left and right forward and rear wheels of the truck in the proper direction and distance with relation to one another.

From the foregoing it will be evident that upon operation of the steering column 28, the turn bolt 32 will be turned in the proper direction to swing the wheels of the front truck in one direction by the wheels of the rear truck or swung in the reverse direction and at the proper angle to the body of the vehicle and the wheels of the front truck.

Positioned longitudinally of the vehicle beneath the body 53 thereof is a casing or support 54 which would rest upon and may be formed with the main transverse members 1 of the truck to inclose a drive shaft 55 which has a worm 56 formed thereon for each main axle section 15, said worm 56 being engaged with a worm wheel 57 mounted upon one of the main axle sections 15, it being understood that each main axle section 15 is mounted in suitable supporting brackets 58 projecting upwardly from the bottom of the casing 54.

The drive shaft 55 has a gear wheel 59 mounted thereon which is engaged by another gear wheel 60 mounted upon a shaft 61 leading from the engine, (not shown) inclosed in the front portion of the vehicle body and covered by the usual hood 62. It will be understood that the shaft 61 is provided with a suitable clutch 63 of conventional form, whereby the portion of the shaft 61 upon which the gear 60 is mounted may be caused to rotate or remain stationary, as desired, during the operation of the engine.

It will be understood that the body 53 of the motor vehicle may be of any form desired but is shown in my drawings as being in the form of a wagon or large truck with the seat 64 in the front portion of the body, just in back of the steering column 28 which may have the steering wheel 65 mounted upon its upper end, if desired.

The body 53 is mounted upon a plurality of elliptical springs 66 which are carried upon the upper ends of the standards 67 mounted in any suitable manner upon the extended reduced ends 68 of the main transverse members 1 of the front and rear truck, as shown at 69.

While the preferred embodiment of the invention has been shown and illustrated, it will be understood that minor changes in the details of construction and arrangement of parts may be made within the scope of the appended claims without departing from the spirit of the invention or sacrificing any of the advantages thereof.

What is claimed is:—

1. A motor vehicle including a pair of trucks, each truck having a transverse member, oppositely curved arms on opposite ends of said member, wheels mounted in said arms, axles connecting said wheels at the opposite sides of the trucks, means for driving the axles, a casing for the driving means, a body supported above the trucks, and means connecting the wheels together for turning them in either direction, a knuckle connection between the wheels and axles, a steering column, a turn bolt, means connected with the steering column and the turn bolt to turn said turn bolt upon rotation of the steering column in either direction and projecting in opposite directions from the turn bolt, connections between one of said arms of the turn bolt and the wheels of the front truck to turn the same upon rotation of the turn bolt, and connections between the remaining arms of the turn bolt and the wheels of the rear truck to turn the same in a reverse direction.

2. A truck for motor vehicles comprising a transverse member, a pair of arms pivotally mounted at points centrally between their ends upon said member, spindles pivotally mounted upon the ends of said arms, wheels journaled upon the spindles, a steering mechanism connected to said spindles, a support carried by said transverse member, a central axle section journaled upon said support, outer axle sections secured to said wheels, intermediate axle sections having universal connection with the central and outer axle sections, and a drive shaft journaled upon the support and geared to the central axle sections.

3. A truck for motor vehicles comprising a transverse member, a pair of arms pivotally mounted at points centrally between their ends upon said members, spindles mounted upon the ends of said arms, wheels journaled upon the spindles, a support carried by said transverse member, a central axle section journaled upon said support, outer axle sections secured to said wheels, intermediate axle sections having universal connection with the central and outer axle sections, and a drive shaft journaled upon the support and geared to the central axle sections.

4. A truck for motor vehicles comprising a transverse member, a pair of arms pivotally mounted at points between their ends upon said member, spindles carried by said arms, wheels journaled upon said spindles, a support carried by said member, a drive shaft journaled upon said support and universally connected between said drive shaft and said wheels, a central axle section journaled upon said support, outer axle sections secured to said wheels, intermediate axle sections having universal connection with the central and outer sections, and a drive shaft journaled upon the support and geared to the central axle sections.

In testimony whereof I affix my signature in presence of two witnesses.

EUGENE MICHELIN.

Witnesses:
PHIL S. MAY,
THOS. R. PRUITT.